Patented Nov. 28, 1922.

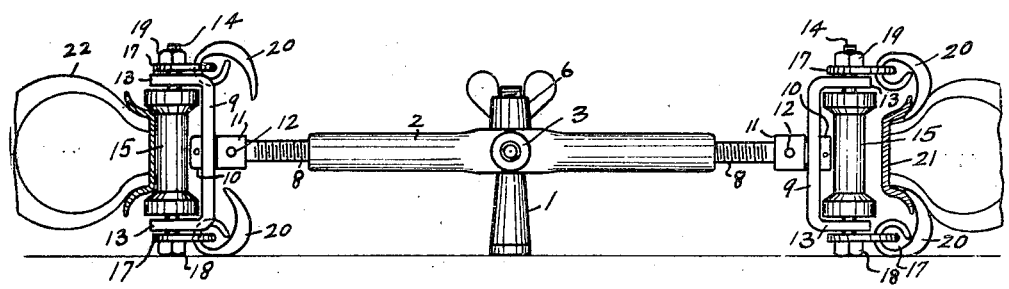
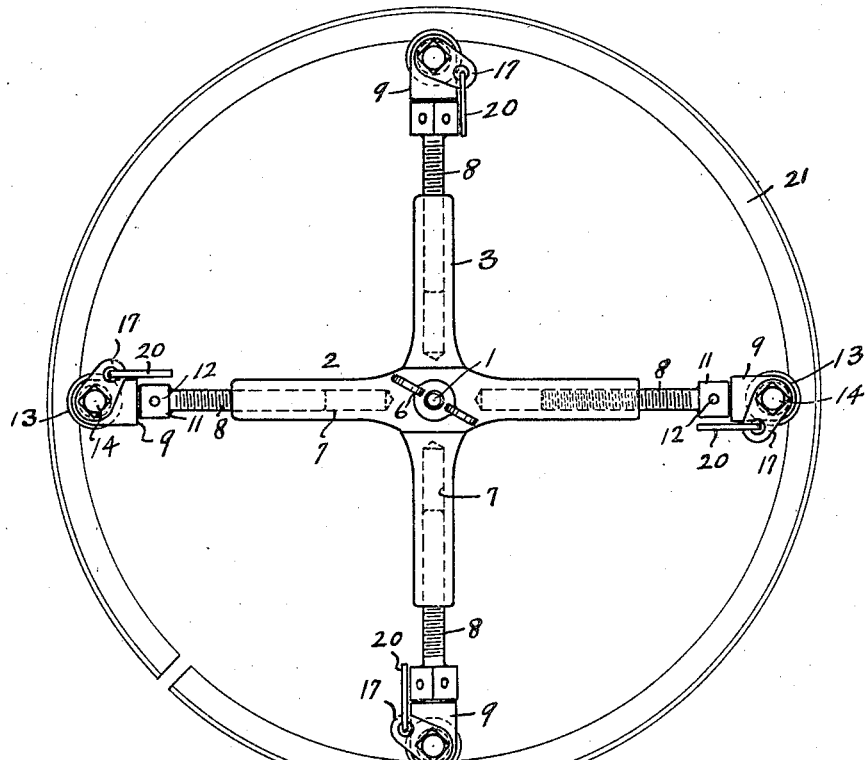

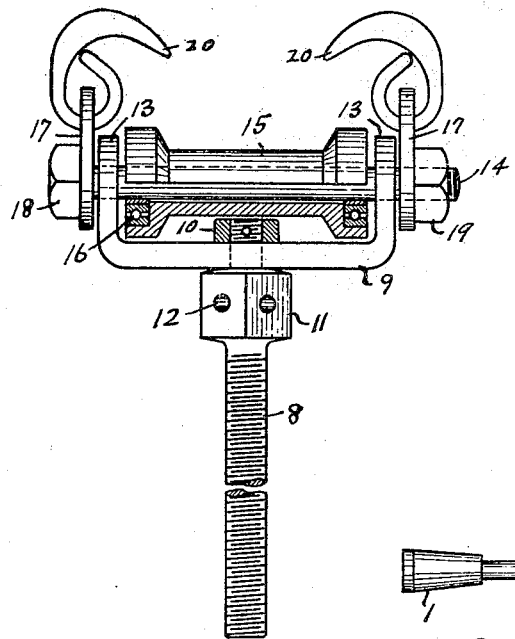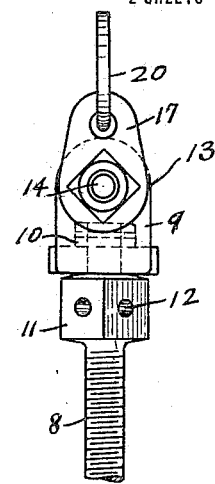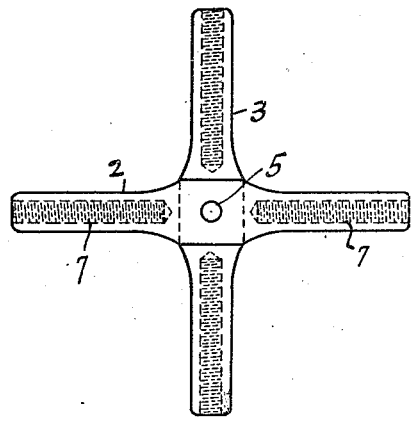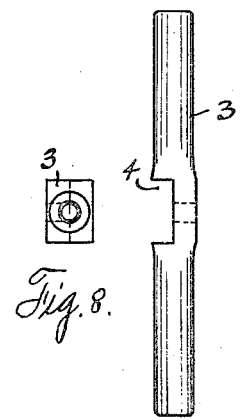

1,436,789

UNITED STATES PATENT OFFICE.

JESSE J. BAKER, SR., OF FREEPORT, TEXAS.

RIM BREAKER.

Application filed November 22, 1921. Serial No. 516,950.

*To all whom it may concern:*

Be it known that I, JESSE J. BAKER, Sr., citizen of the United States, residing at Freeport, in the county of Brazoria, and State of Texas, have invented certain new and useful Improvements in Rim Breakers, of which the following is a specification.

This invention relates to new and useful improvements in a rim breaker.

One object of the invention is to provide an apparatus of the character described which has been specially formed for the purpose of contracting a tire rim to demount the tire and for expanding said rim after the tire has been mounted thereon.

Another object of the invention is to provide an apparatus of the character described which is of simple construction and may be easily and readily applied to the work.

A further feature of the invention resides in the provision of an apparatus of the character described which is readily portable.

With the above and other objects in view the invention has particular relation to certain novel features of construction, operation and arrangement of parts an example of which is given in this specification and illustrated in the accompanying drawings wherein;

Figure 1 is a side elevation of the device.

Figure 2 is a plan view.

Figure 3 is an enlarged side view of one of the rim engaging members shown partially in section.

Figure 4 is an enlarged edge view thereof.

Figure 5 is a side view of the supporting spindle.

Figure 6 is a plan view of the frame and,

Figures 7 and 8 show side and end views of one of the frame members.

Referring now more particularly to the drawings the numeral 1 designates the supporting spindle whose lower end is enlarged forming a stand and whose upper end is reduced and outwardly threaded.

The frame is formed of the members 2 and 3. These member are detachably secured together by means of the central interlocking notches 4 and they have a central bearing 5 through which the reduced upper end of the spindle extends. The frame is secured on said spindle by means of the nut 6 which is screwed on the upper end of the spindle. The respective ends of the frame members 2 and 3 have the deep internally threaded sockets 7 into which the actuating rods 8 are threaded. The outer ends of these rods extend through the respective yokes 9 which are secured against detachment by means of the nuts 10 which are threaded onto the outer ends of said rods and keyed thereon. Adjacent said yokes the actuating rods have the enlarged heads 11 formed integral therewith and provided with sockets 12 to receive the rod by means of which they may be turned. The yokes are provided with aligned bearings 13 which receive the bearing bolts 14. Rotatably mounted on these respective bolts are the rollers 15, mounted to rotate on anti-friction bearings 16. Outside of the bearings 13 and mounted on the respective ends of the bolts 14 are the links 17 which are retained in position by means of the head 18 and the nut 19 respectively of said bolt. The free ends of these links have the rim engaging hooks 20 formed to engage over the respective flanges of the tire rim 21, as illustrated at the right hand side of Figure 1.

When it is desired to contract the rim to demount the tire 22 therefrom said tire is deflated and the apparatus is placed within the rim and the hooks 20 engaged over the rim flanges. The actuating rods 8 are then turned so as to screw them into the sockets 7 and the rim may thus be contracted so as to readily demount the tire. When it is desired to remount the tire it is placed around the rim and the hooks 20 are disengaged from the rim as shown in Figure 2 and the actuating rods 8 are turned in the other direction so as to screw them outwardly in the sockets 7. The rollers 15 will then operate against the tire rim to expand it and bring its free ends into alignment as shown in Figure 2 and the actuating rods 8 then screwed back into said sockets so as to release the apparatus from the rim.

The apparatus may be readily taken apart for storage by unscrewing the nut 6 and detaching the members 2 and 3 from each other. When thus dismounted it may be readily carried under the seat of the ordinary vehicle.

What I claim is:

1. A rim breaker including a stand whose upper end is reduced forming a spindle, a frame formed of two members arranged at substantially right angles to each other and detachably secured together by means of central interlocking notches, said frame having a central bearing through which said spindle extends, the ends of the respective frame members having deep internally threaded sockets, actuating rods threaded into the respective sockets and formed near their outer ends with enlarged heads, yokes abutting against the outer ends of the respective heads and having a swiveling connection with said rods, aligned bearings carried by the ends of the respective yokes, bearing bolts working in said bearings, rollers mounted on the respective bearing bolts, links carried by the respective ends of said bearing bolts, and rim engaging hooks carried by the respective links and formed to engage over the tire rim flanges.

2. A rim breaker including a supporting member whose upper end is reduced and formed into a spindle, a frame formed of cross members having interlocking central notches by means of which they are detachably secured together, said frame having a central bearing to receive said spindle, means for detachably securing the frame on the spindle, the respective ends of the frame members having deep internally threaded sockets, actuating rods threaded into the respective sockets and whose outer ends are formed with enlarged heads, yokes having a swiveling connection with the respective rods adjacent the outer ends of the heads, each head being provided with a socket to receive a rod by means of which the actuating rods may be turned, said yokes being provided with aligned bearings, bearing bolts working in said bearings, rollers mounted on the respective bearing bolts, links carried by the respective ends of said bearing bolts, and rim engaging hooks carried by the respective links.

In testimony whereof I have signed my name to this specification in the presence of two subscribing witnesses.

JESSE J. BAKER, Sr.

Witnesses:
  W. A. RANDLE,
  A. MUNSON.